March 18, 1969  R. CARETTA ET AL  3,433,695
APPARATUS FOR MANUFACTURING PNEUMATIC TIRES
Filed July 23, 1965

Inventors
Renato Caretta
Antonio Pacciarini
Dario Giletta
By Stevens, Davis, Miller & Mosher
Attorneys Inventors
Renato Caretta
Antonio Pacciarini
Dario Giletta Inventors
Renato Caretta
Antonio Pacciarini
Dario Giletta
By Stevens, Davis, Miller + Mosher
Attorneys Inventors
Renato Caretta
Antonio Pacciarini
Dario Giletta

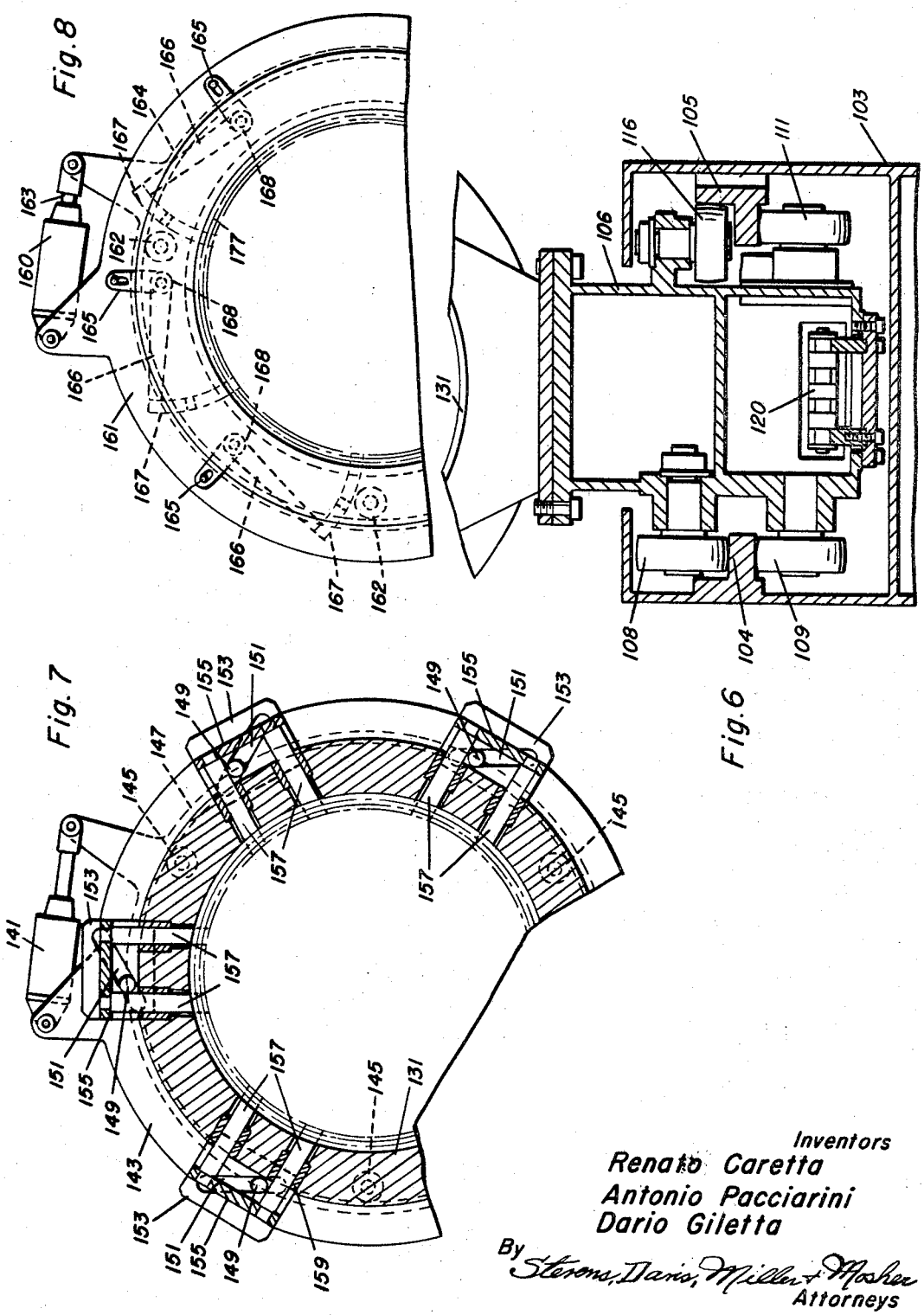

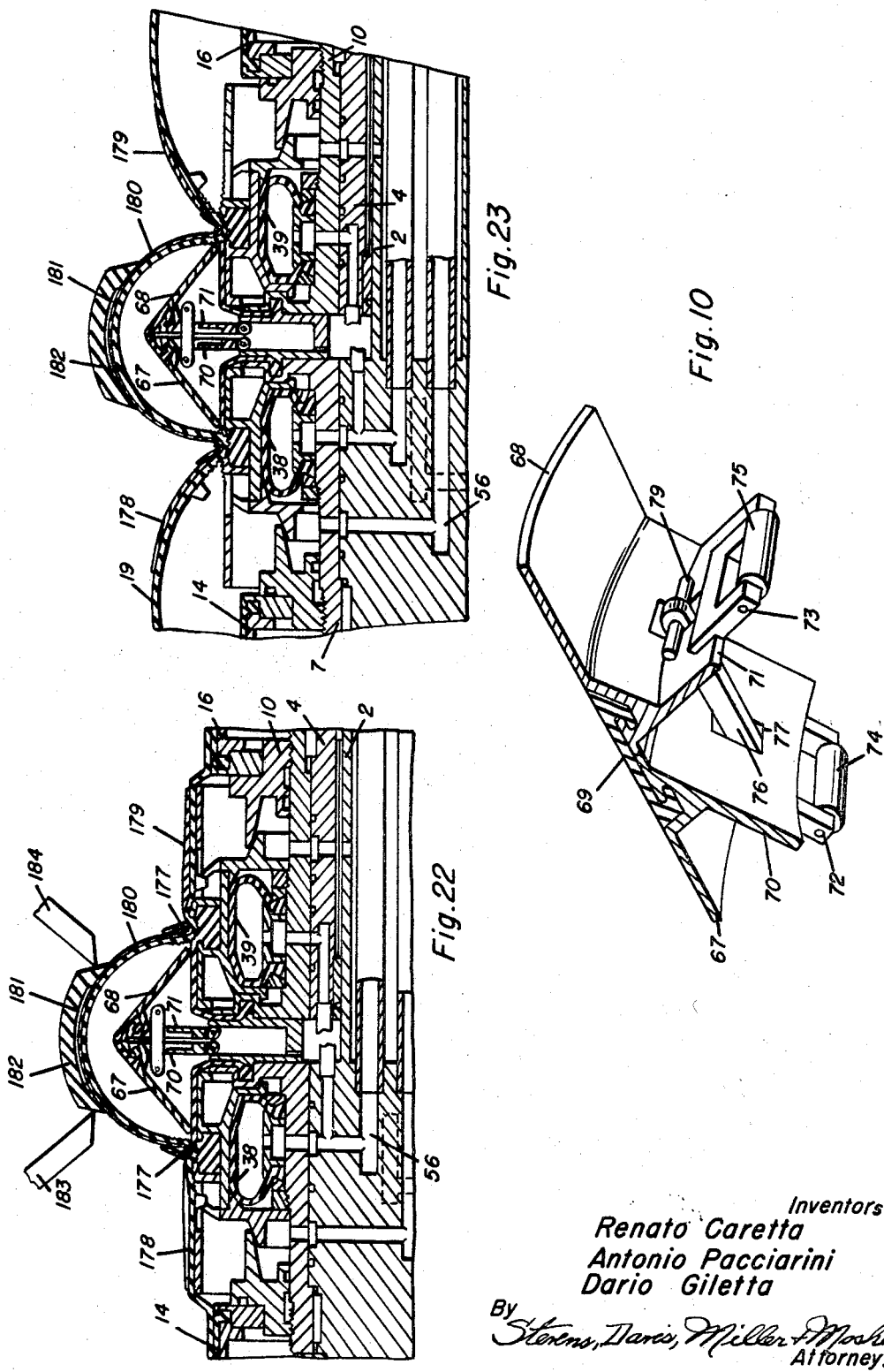

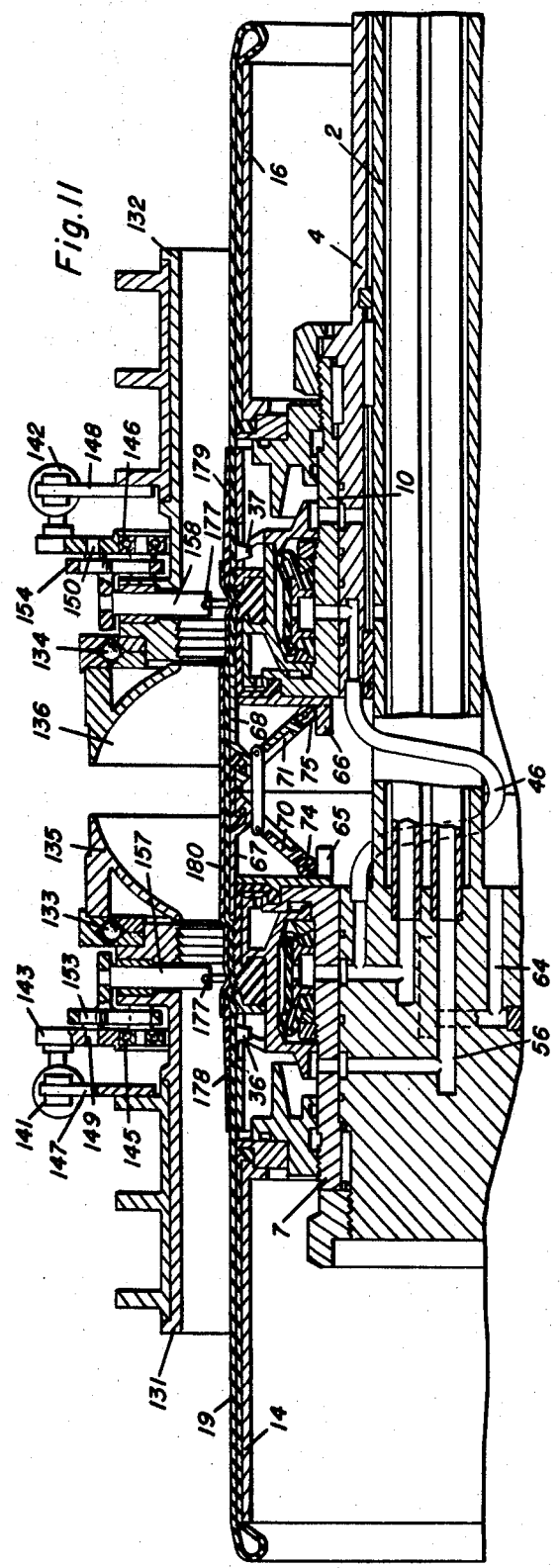

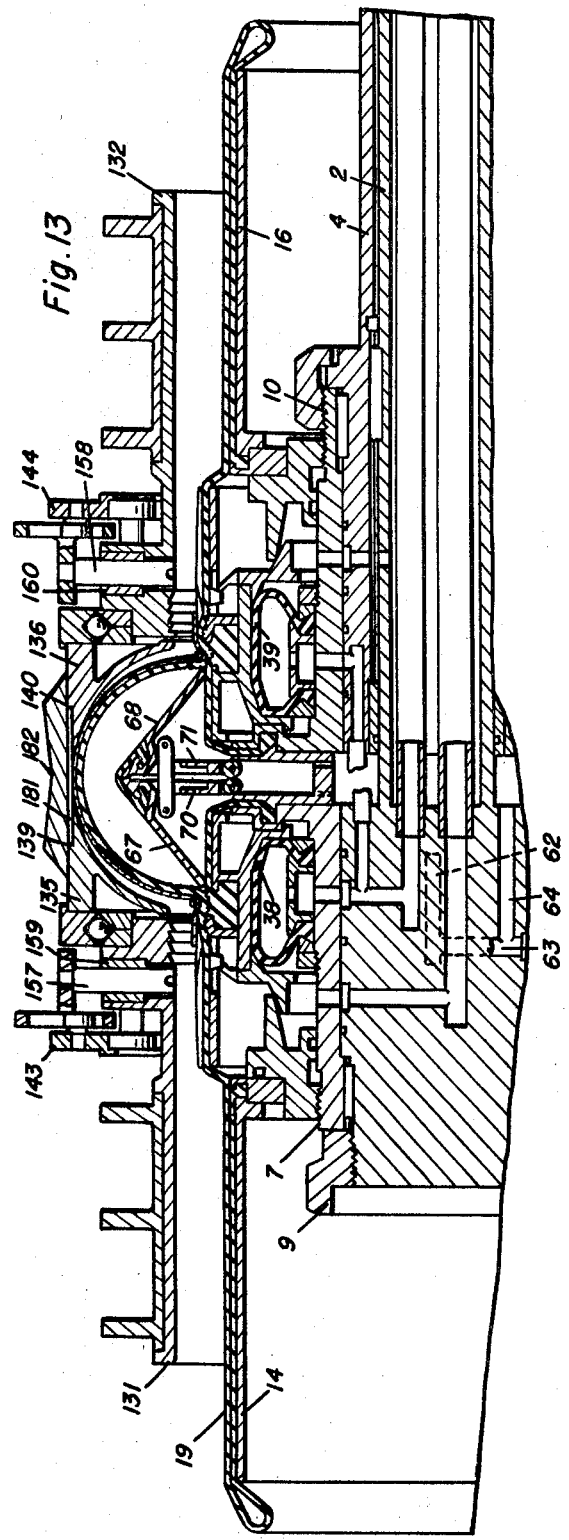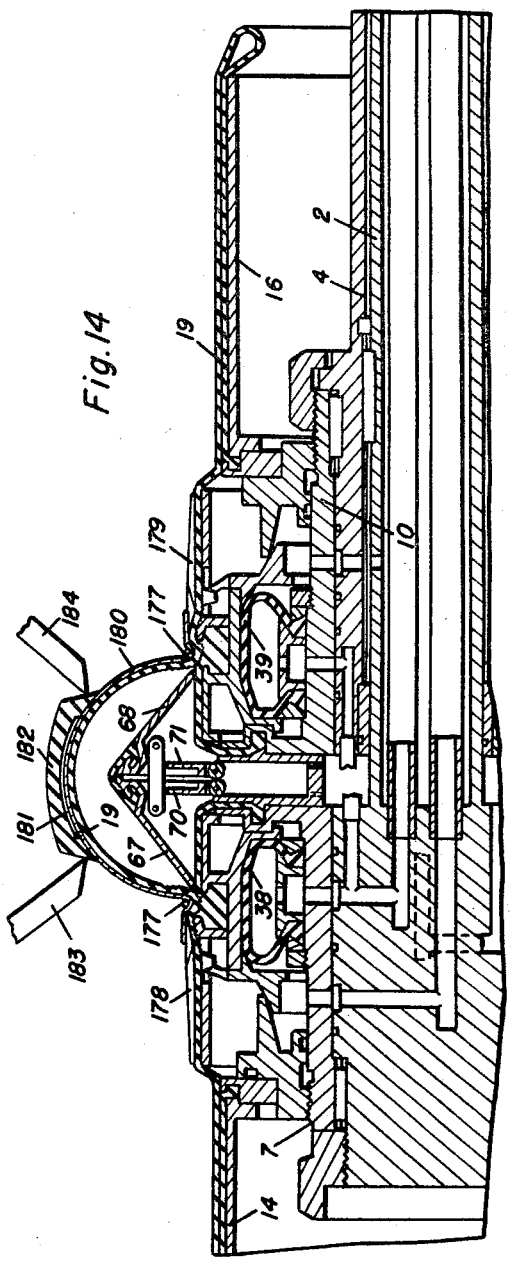

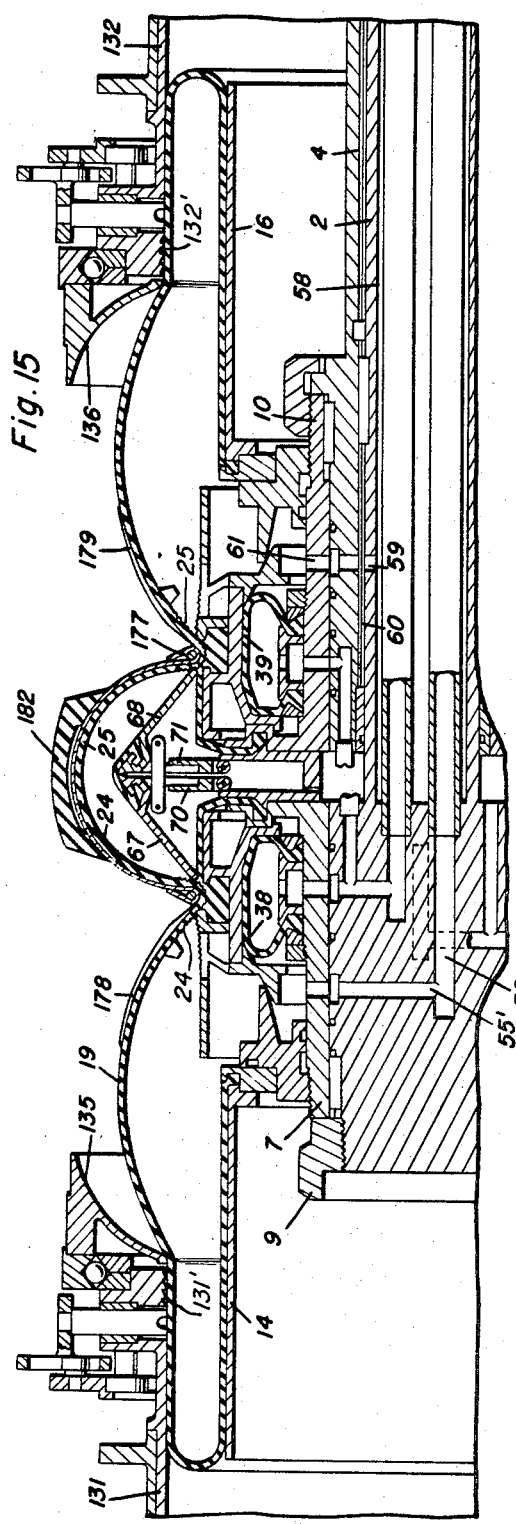

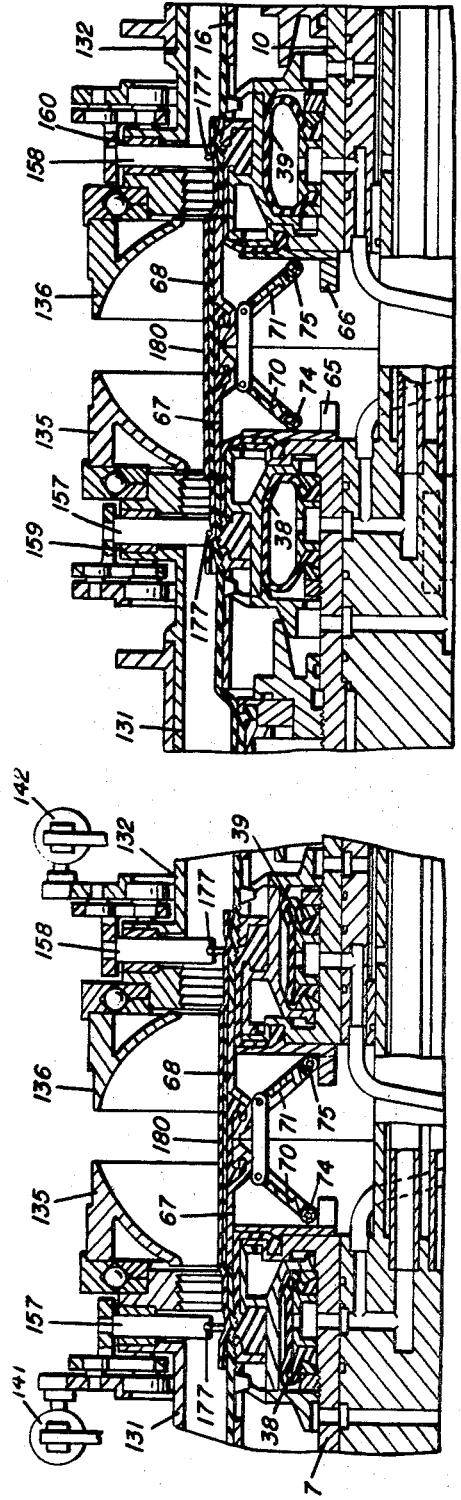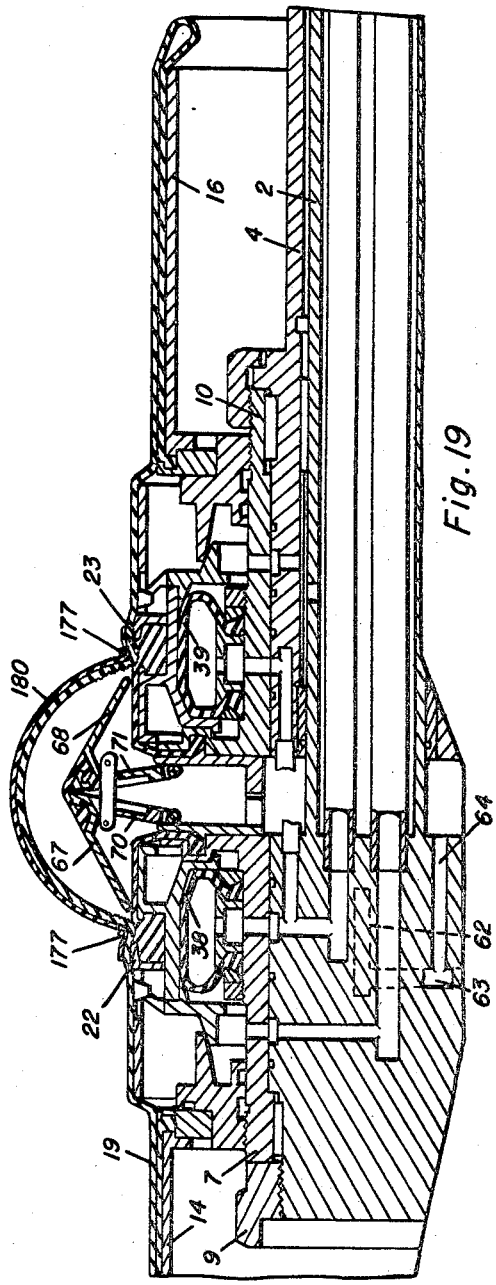

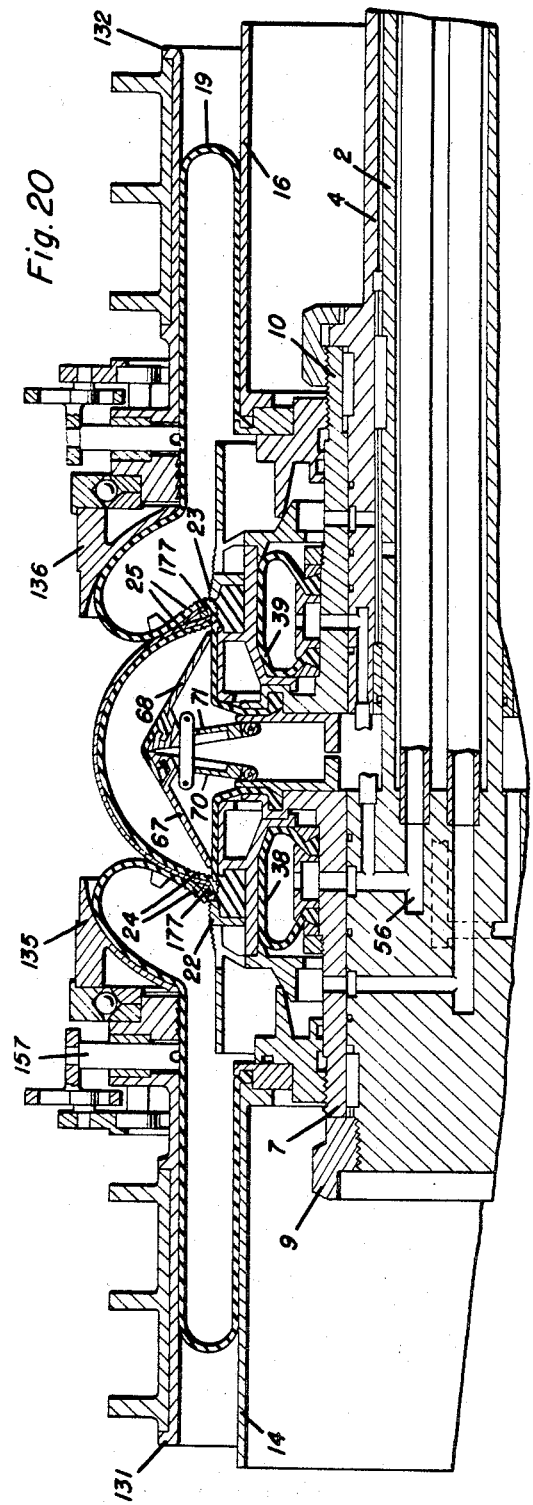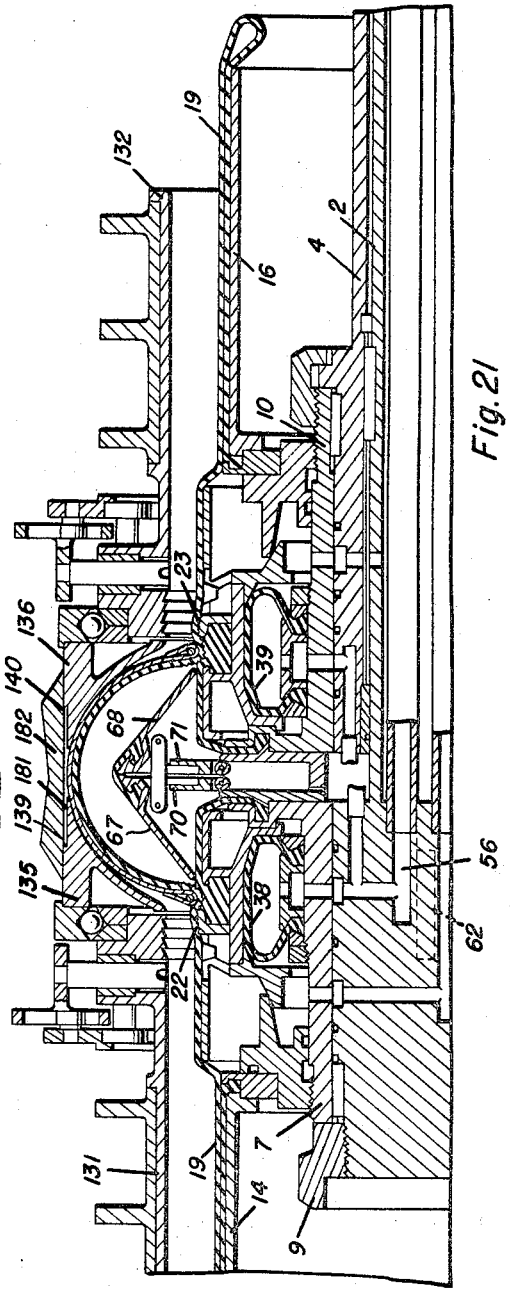

United States Patent Office 3,433,695
Patented Mar. 18, 1969

3,433,695
APPARATUS FOR MANUFACTURING
PNEUMATIC TIRES
Renato Caretta, Gallarate, Varese, and Antonio Pacciarini and Dario Giletta, Milan, Italy, assignors to Pirelli S.p.A., Milan, Italy
Filed July 23, 1965, Ser. No. 474,408
Claims priority, application Italy, July 24, 1964,
16,209/64
U.S. Cl. 156—401                 27 Claims
Int. Cl. B60c 9/10, 15/04

ABSTRACT OF THE DISCLOSURE

An apparatus for producing pneumatic tires in a manner whereby the carcass ply edges as well as the sidewall strips may be simultaneously turned up around the bead wires and applied against the sides of said carcass after the tire tread has first been stitched to said carcass, this being made possible through the provision of special means for anchoring the plies against the bead wires whereby said plies will not slip relative to said wires although only the carcass portion of the inflatable membrane is inflated during the carcass formation without preceding or simultaneous inflation of the sidewall portions of said membrane.

---

The present invention relates to an apparatus for manufacturing pneumatic tires having a radial or crossed carcass comprising one or more plies, the edges of all the plies being turned about the bead-reinforcing wires towards the outer surface of the carcass, and having strips constituting the sidewalls and the other possible component elements of the carcass being turned and lapped on the already shaped carcass with the same means and in the same way as made in respect of the ply edges. The invention constituting the apparatus is adapted to carry out this as well as other methods of making tires.

As it is known to those skilled in the art, the manufacture of pneumatic tires having a crossed or radial carcass, generally comprises the following operations: one or more plies are normally applied in cylindrical form on a building drum; on these plies, in alignment with the drum shoulders, are applied the bead-reinforcing wires in such a way that the ply ends may project laterally from these wires, and the projecting ply ends are then turned up towards the outer surface of the plies; said outer surface being maintained substantially cylindrical. If desired, the assembly so obtained is covered with one or more plies, whose edges are turned down towards the axis of the building drum and are caused to adhere to the outwardly turned edges of the first plies applied on said drum. The tire is completed, before or after the shaping operation, generally by applying the tread band and sidewall strips to the carcass and also possibly by applying thereto a ring-shaped reinforcing structure. The strips constituting the sidewalls may be integral with the tread or independent thereof, and in the latter case their edges nearest to the carcass midline, when assembly is completed, may be displaced below or above the edge of the tread band. In any case, however, strip application is always carried out after having outwardly turned the edges of the carcass plies about the wires from which they project.

Besides the strips constituting the sidewalls, other strips of rubber or of rubberized fabric, having a width smaller than that of the sidewall strip, are normally applied on the carcass plies. These strips are usually applied in various stages of the tire manufacture and their application is always carried out by hand. In fact, up to the present time, it was not possible to effect simultaneously the outward turning up of the ply edges about the bead wires and the application on the carcass of the strips constituting the sidewalls and the other component elements of the carcass itself, not even by using building drums comprising an expansible membrane protruding laterally beyond the seats for the wires. Heretofore since the membrane was inflated to shape the carcass plies, it had a tendency to slide longitudinally under the wires towards the drum midline, exerting a dragging action on the plies overlying it. It was therefore necessary to turn up the ply edges about the wires before shaping said plies, in order to secure them to the wires and thereby prevent their sliding during inflation of the carcass portion.

An object of the present invention is an apparatus, representing an improvement to the machine described in the prior U.S. Patent No. 3,053,308 of the same assignee, the present apparatus being characterized in that it permits the simultaneous turning up of the ply edges about the bead wires and the application of the sidewall strips and other possible carcass components onto the already shaped carcass, thereby reducing the required production time, said apparatus, however, being also adapted to carry out other methods for the manufacture of pneumatic tires.

Another object of the present invention is to provide an apparatus which is capable of manufacturing pneumatic tires of different sizes, means being provided for adjusting the maximum axial distance between the two bead wire seats.

Another object of the present invention is to provide an apparatus for manufacturing tires having bead wires of different diameters, means being provided for adjusting the maximum diameter of the bead wire seats.

Yet another object of the present invention is to provide an apparatus which ensures that the position of the bead wire seats with respect to that of the sidewalls of the tire building drum, and consequently also the preestablished distance between the bead wires, remains strictly constant during the shaping of the carcass on said drum.

Still another object of the present invention is to provide bead wire seats whose profile ensures that the position of the bead wires in their seats remains strictly constant during the shaping of the carcass.

Another object of the present invention is to provide an apparatus wherein the width of the tire sidewalls is maintained constant during their turning movement upward and toward the carcass so that said sidewalls are applied to the tire with great accuracy.

Yet another object of the present invention is to provide an apparatus for making tires which mechanically applies the bead wires accurately in a predetermined position.

Another object of the present invention is to provide an apparatus whereby the tire carcass may be stitched with the same accuracy as in the case of a rigid collapsible drum, and may be shaped on the same drum on which it has been built up and stitched. This is provided by the presence of two series of rigid sectors connected by means of an elastic structural shape, which allows the inclination of said sectors with respect to the outer surface of the rigid sectors housing the seats of the bead wires. By adopting these pairs of sectors, it is also possible to build up tires of various size, within comparatively wide limits, without subjecting the apparatus to modification.

Another object of the present invention is to provide an apparatus for building tires according to the greatest accuracy yet achieved in tire manufacture, this object being realized through the provision of an indentation on the portions of the inner surface of the drum membrane which coact with the seats of the bead wires and on the outer surface of the seats, as well as through the provision of rigid frusto-conical shoulders at the axially outermost ends of the seats for the bead wires. In this way, the membrane of the drum may be perfectly anchored in relation to the seats and, consequently, the axial displacement of said membrane and of the carcass plies superimposed thereon may be avoided, even if high pressures are adopted for the fluid admitted inside said membrane.

These and other features of the present invention will be more clearly apparent from the following detailed description of a preferred embodiment of the same, given only by way of example and made with reference to the attached drawings, in which:

FIG. 6 represents in its left-hand half a cross section of the machine taken along plane 6a—6a in FIGURE 1, and in its right-hand half a cross section taken along plane 6b—6b of the same figure;

FIG. 7 is a cross section of the device for the application of the bead wires, taken along plane 7—7 of FIG. 1;

FIG. 8 represents in cross section an alternative realization of the device for the application of the bead wires, shown in FIG. 7;

FIG. 9 is a detail of the expansible building drum of the machine shown in FIG. 1;

FIG. 10 is a detail of the central portion of the expansible building drum shown in FIG. 2;

FIGS. 11 to 16 represent the machine of FIG. 1 in the various steps of the manufacturing process according to which the strips constituting the sidewalls and the other possible component elements of the carcass are applied to the carcass simultaneously with the turning up of the ply edges about the bead wires;

FIGS. 17 to 23 represent the machine of FIG. 1 in the various steps of the manufacturing process according to which the strips constituting the sidewalls and the other possible component elements of the carcass are applied to the carcass subsequently to the turning up of the ply edges about the bead wires. FIG. 16 also illustrates the last step in this process.

Figure 1:
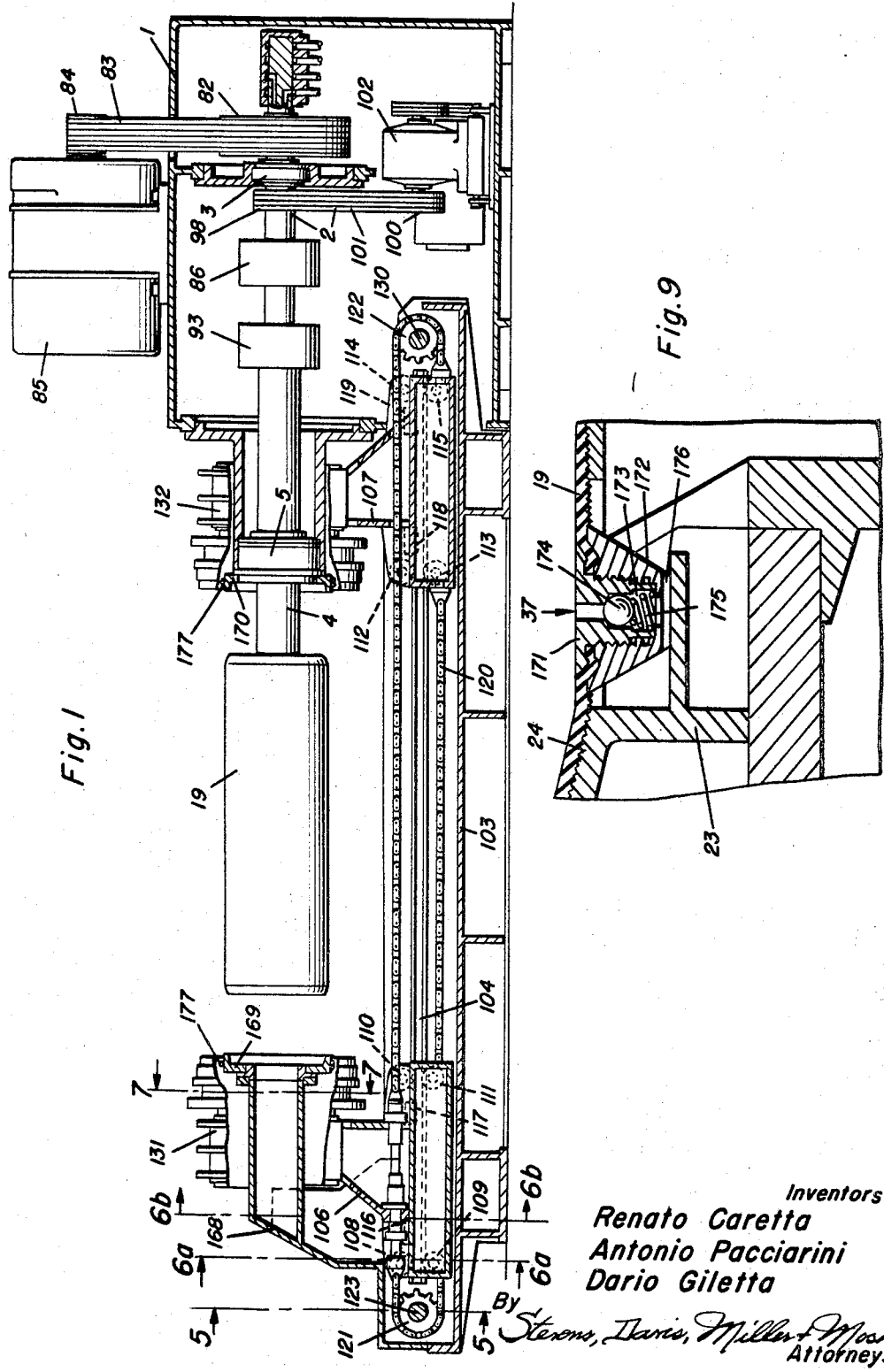
FIG. 1 is a front view, partially sectioned, of the complete machine in accordance with the present invention.

The machine represented in FIGS. 1 to 10 comprises a frame 1, in which are cantilevered the hollow mandrel 2, by means of the journal bearings 3, and the hollow mandrel 4, by means of the journal bearings 5. Mandrels 2 and 4 are longitudinally slidable relative to each other but are integrally rotatable by operation of key 6.

Figure 2:
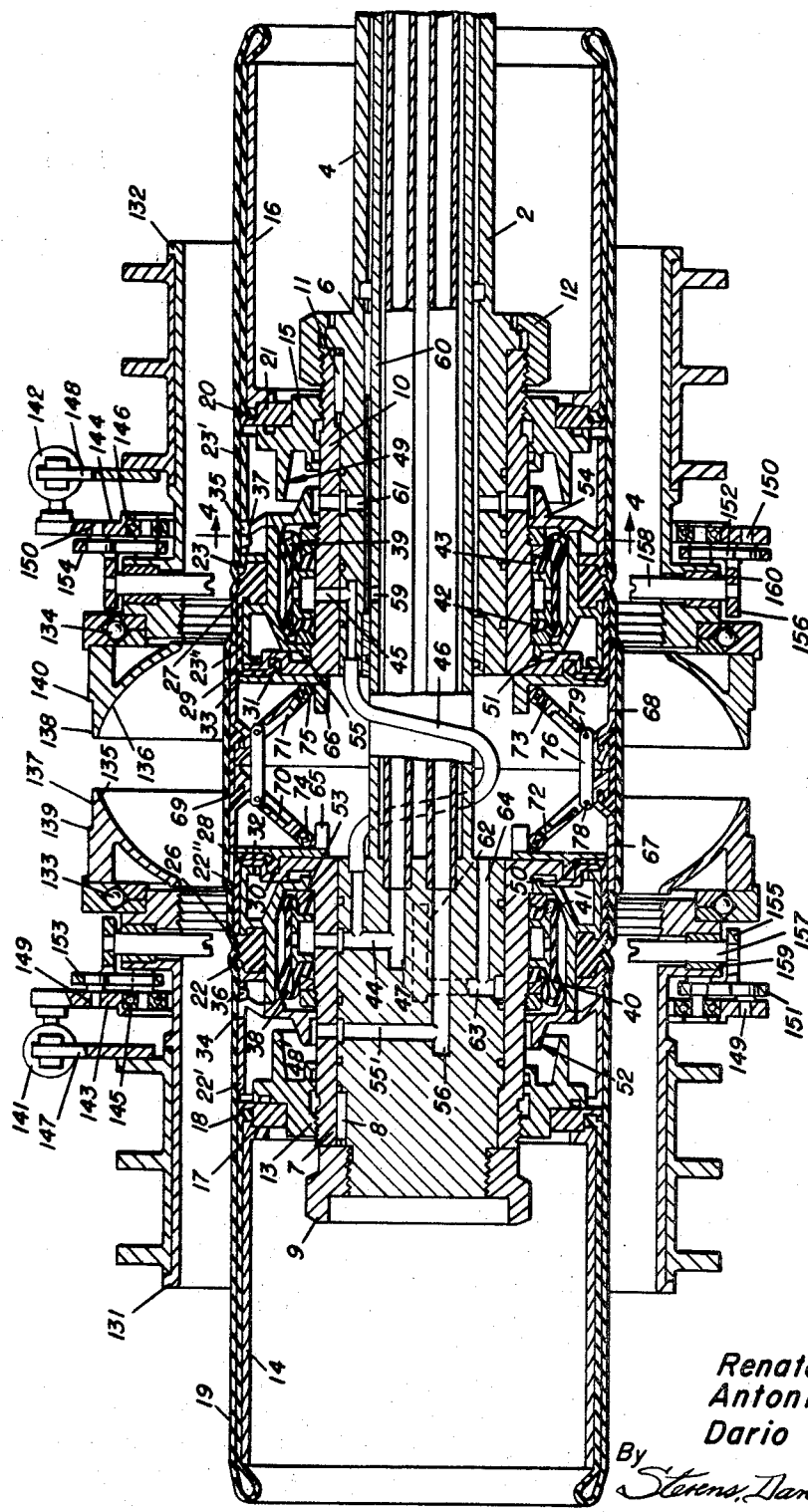
FIG. 2 is a longitudinal vertical section of the expansible building drum of the machine shown in FIG. 1, and of the devices telescopically displaced along said drum.
Figure 3:
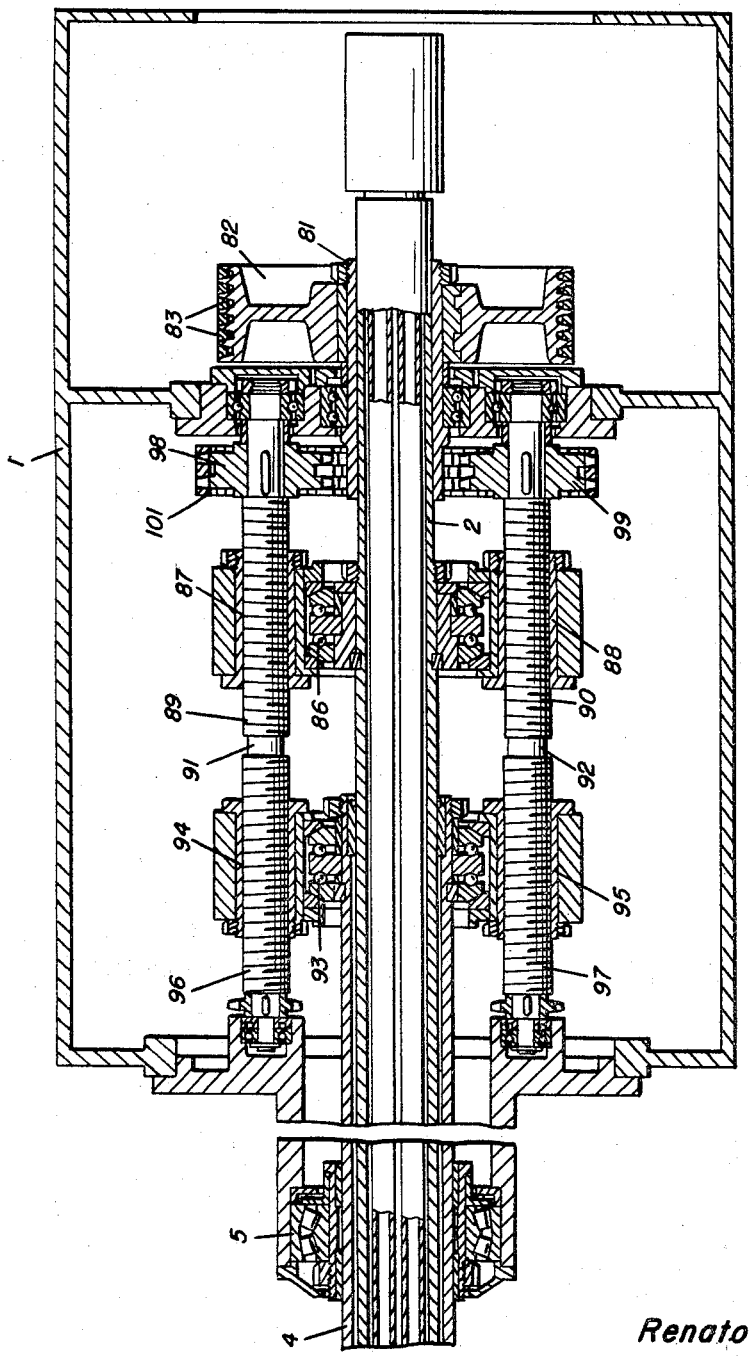
FIG. 3 is a horizontal section of the right lateral portion of the machine shown in FIG. 1.
Figure 5:
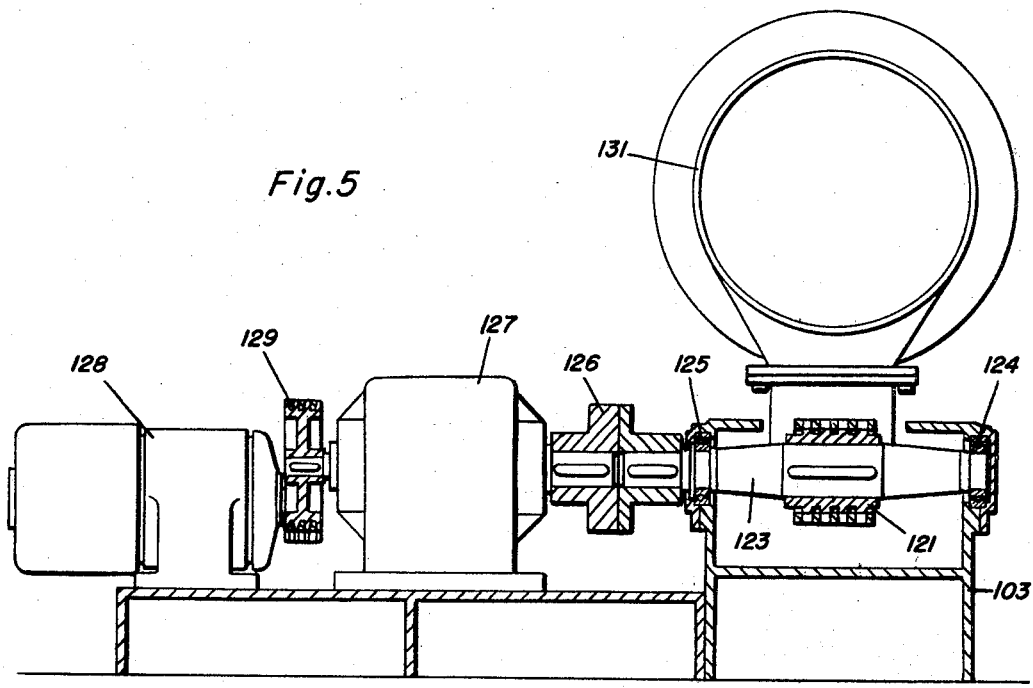
FIG. 5 is a cross section taken along plane 5—5 of FIG. 1.
Figure 4:
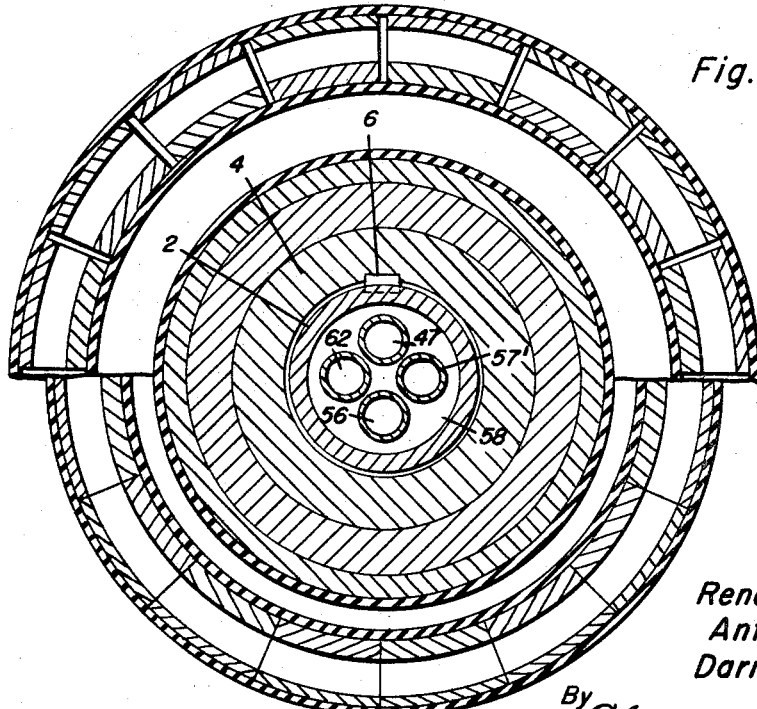
FIG. 4 is a cross section of the building drum taken along plane 4—4 of FIG. 2, the upper part of the figure representing the drum in expanded condition, and the lower part representing the drum in rest condition.

With particular reference to FIG. 2, the sidewall 7 of an expansible drum is inserted on the cantilever end of the mandrel 2; the rotation of said sidewall with respect to the mandrel 2 is prevented by means of the key 8, and its axial displacement is prevented by means of the nut 9 threaded on the mandrel 2.

Likewise, the sidewall 10 of the expansible drum is inserted on the end of the mandrel 4 which extends towards the sidewall 7. The rotation of this sidewall with respect to the mandrel 4 is prevented by means of the key 11, and its axial displacement is prevented by means of the nut 12 threaded on the mandrel 4.

A rigid cylinder 14 is secured to the sleeve 13 which is threaded on the sidewall 7, and a rigid cylinder 16 is secured to the sleeve 15 which is threaded on the sidewall 10. Between the rigid cylinder 14 and a ring 17 which is integral with the sleeve 13, there is clamped the thickened edge 18 of an expansible tubular membrane 19, the other thickened edge 20 of which is clamped between a ring 21 integral with the sleeve 15, and the rigid cylinder 16. The membrane 19, starting from the edge 18, rests directly on the rigid cylinder 14, forms a loop projecting from said cylinder, folds upon itself, rests subsequently on two series of circular rigid sectors 22 and 23 respectively assembled on the sidewalls 7 and 10, extends on the rigid cylinder 16, forms a second loop outside said cylinder and extends towards the drum midline, resting, as far as its thickened edge 20, directly on the cylinder 16. The membrane 19 incorporates longitudinal reinforcements which render it axially inextensible, and is provided on its inner surface with two serrated portions 24 and 25 (see FIG. 15) overlying corresponding serrated portions in the two series of rigid sectors 22 and 23, and on its outer central surface with a transverse groove to facilitate removal of the finished tire.

The sectors 22 and 23 are constituted by an axially outermost portion 22' and 23', provided on at least a part of its outer surface with serrations corresponding to those of the portions 24 and 25 of the membrane, and by an axially innermost portion 22" and 23", having a smooth surface. Between these two parts there is provided a seat into which are respectively housed the elastic rings 26 and 27, provided with tubular extensions 28 and 29 which terminate with the thickened edges 30 and 31, respectively clamped between the sidewalls 7 and 10 and the rings 32 and 13 fastened to said sidewalls. The elastic rings 26 and 27 are peripherally provided with a concave indented recess, which constitutes a seat for the reinforcing wires of the tire beads. Tubular extensions 28 and 29 function to provide fluidtightness along the smooth surface portions of the sectors 22 and 23. The portion of the sectors having an indented outer surface, in correspondence of the seats into which are housed the rings 26 and 27, has a frusto-conical surface, whose diameter decreases towards said seats in order to provide the tire beads with a rigid and consequently nondeformable support during the shaping of the tire carcass.

The sectors 22 and 23 in proximity of the rings 26 and 27 on their axially outermost portion 22' and 23' are moreover provided with holes 34 and 35, into which are encased the frusto-conical valves 36 and 37, tightly inserted in an opening of the membrane 19, with which they are fast. The one-way valves 36 and 37 are normally closed and open only when the pressure under membrane 19 is less than the pressure outside membrane 19, as it will be described in detail herebelow.

Between the sidewall 7 and the sectors 22, and between the sidewall 10 and the sectors 23, there are respectively housed the inflatable tubular membranes 38 and 39, whose thickened edges 40, 41 and 42, 43 are clamped on the periphery of the corresponding drum sidewalls. The membranes 38 and 39 are provided with transverse shaping reinforcements along about three quarters of their transversal development, beginning at the axially outermost thickened edge (40, 43), in order not to be pinched between the series of sectors 22, 23. The portion of said membranes which is the nearest to the drum midline is devoid of reinforcements in order that the sectors may be completely displaced towards said midline when the membranes 38 and 39 are inflated to exert an axial thrust on said sectors. In this way it is possible to ensure a perfect conformity with the preestablished distance between the bead wires.

The inside of the membranes 38 and 39 may be alternatively connected with a source of compressed fluid or with a vent outlet, by means of ducts 44 and 45, defined in the sidewalls 7 and 10 and connected to each other by means of the tube 46, and by means of the tube 47 passing inside the mandrel 2.

The expansion of the tubular membranes 38 and 39, besides exerting a pressure on the sectors 22 and 23 towards the drum midline, exerts a radially outward displacing force upon said sectors, which is opposed by the elastic rings 26 and 27 and is limited by the frusto-conical surfaces 48 and 49 of the sleeves 13 and 15 and by the cylindrical surfaces 50 and 51 of the side-walls 7 and 10, against which rest the frusto-conical surfaces 52, 53 and 54, 55 of the sectors 22 and 23.

The position of the frusto-conical surfaces 48 and 49 of the sleeves 13 and 15 may be axially varied, with respect to that of the surfaces 52 and 54 of the series of the sectors 22 and 23, by screwing more or less the sleeves 13 and 15 on the corresponding sidewalls.

By varying such mutual position, the travel of the sectors 22 and 23 may be varied radially outwardly according to the inner diameter of the bead wires adopted for the pneumatic tires to be manufactured. In the end portion of the mandrel 2 there is defined a duct 55', which opens, through the sidewall 7, in the space comprised between the sleeve 13 and the segments 22 and is connected at the other end with the tube 56 passing axially inside the mandrel 2. Moreover, this mandrel is traversed axially by the tube 57 (see FIG. 4) provided with holes 57' which open in the hollow space 58, connected by means of the hole 59 to the gap 60. This gap 60, by means of the duct 61, is also connected to the space comprised between the sleeve 15 and the segments 23. Both the tube 56 and the tube 57 may be alternatively connected with a source of compressed fluid, as for instance a tank of variable capacity, not illustrated in the figures, or with a vacuum pump. The volume and the pressure of this tank are adjusted before the process begins. The mandrel 2 also contains tube 62, one end of which is connected to the ducts 63 and 64 provided at the cantilever end of the mandrel 2, and the other end of which may be connected with a source of compressed fluid or with vent means. The duct 64 opens in the drum space through the sidewalls 7 and 10.

The rings 32 and 33, secured to the sidewalls 7 and 10, in correspondence of their end nearest to the mandrel 2, are provided with meshing projections 65 and 66, offset with respect to each other.

Along the periphery of the extensions 28 and 29 of the rings 26 and 27 there are assembled two series of rigid sectors 67 and 68 (see FIGS. 2 and 10), coupled to each other by means of an elastic strap 69, housed in suitable recesses defined in said sectors (FIG. 10). The strap 69 enables angular movement between sectors 67 and 68 while abutting each other at one end. The sectors 67 and 68 each are provided with a leg (70 and 71), which extends towards the axis of the drum and is integral with a fork element (72, 73) in which is pivoted a roller (74 and 75). A shackle 76 is inserted in the holes 77 of the extensions 70 and 71 and is held in place by means of the two pins 78 and 79 so as to be allowed to slide in the holes 77 along the extensions 70 and 71.

The shackle 76 has the purpose of limiting the spreading out of the extensions 70 and 71.

At the end of the hollow mandrel 2 (FIGS. 1 and 3) opposite to that corresponding to the sidewall 7 of the expansible drum, there is assembled a bushing 81, slidable in longitudinal direction by means of the key 80 and integral with the pulley 82. The pulley 82, by means of the belt transmission 83, is connected to the pulley 84, keyed on the shaft of the reversible motor 85. Said motor, in correspondence of an intermediate portion of the mandrel 2, is connected by means of the thrust bearings 86 to the nut screws 87 and 88 which mesh respectively with the threaded portions 89 and 90 of the double-threaded shafts 91 and 92.

At the end of the hollow mandrel 4 opposite to that corresponding to the sidewall 10 of the expansible drum; said mandrel 4, by means of the thrust bearings 93, is connected to the nut screws 94 and 95, which mesh respectively with the threaded portions 96 and 97 of the shafts 91 and 92. The threads 96 and 97 are identical to but have a direction opposite to that of the threads 89 and 90.

On the shafts 91 and 92 there are respectively keyed the sprocket wheels 98 and 92 connected to each other and to the sprocket wheel 100, by means of a chain 101. The sprocket wheel 100 is keyed on the shaft of the reversible motor 102.

On the base 103 (see also FIG. 6), there are secured the rails 104 and 105, onto which the carriages 106 and 107, slidable in opposite directions, are respectively assembled by means of the pair of wheels 108, 109, 110, 111 and 112, 113, 114, 115, having horizontal axes, and 116, 117 and 118, 119 having vertical axes. The carriages 106 and 107 are connected at their ends with an annular chain 120, assembled on a sprocket wheel 121 and a transmission wheel 122. The sprocket wheel 121 (see FIG. 5) is keyed on the shaft 123, supported by the frame 103, by means of the journal bearings 124 and 125 connected by means of a joint 126 to a motor speed reducer 127 actuated by a reversible motor 128 through the belt transmission 129; the transmission wheel 122 is assembled on the shaft 130, also supported by the frame 103. To the carriages 106 and 107 are integral the rigid cylinders 131 and 132, onto which are rotatably assembled (see FIG. 2), by means of the ball bearings 133 and 134, the bells 135 and 136, which are respectively provided on their periphery with an annular band 137 and 138 and with a step 139 and 140.

The rigid cylinders 131 and 132 are moreover provided with serrations 131' and 132' on their inner surface and each of them carries a device for the application of the bead reinforcing wires on the carcass plies.

FIGS. 7 and 8 illustrate two forms of embodiment of said device; in FIGS. 11 and 17 the device of FIG. 7 is represented integrally in cross section, and in FIGS. 12–16 and 18–21 it is shown only in part.

The devices as in FIG. 7 comprise the double-acting cylinders 141, 142, supported by the rings 143, 144, rotatably assembled on the ball bearings 145, 146. The ends of the stems opposite to those connected to the pistons slidable in the cylinders 141 and 142 are respectively pivoted in an extension of the rings 147 and 148, which are integral with the rigid cylinders 131 and 132. The rings 143 and 144 carry respectively the series of pivots 149 and 150 which extend in the grooves 151 and 152 transversely obtained in the series of rectangular elements 153 and 154 disposed at equal intervals along a circumference. Each of the elements 153 and 154 is provided with an extension 155, 156, each of which is fast with a pair of fingers 157, 158, slidably assembled in the corresponding holes of the sleeves 159, 160 supported by the rigid cylinders 131 and 132.

The forward and reverse rotation of the rings 143, 144, with respect to the fixed rings 147, 148, effected by the cylinders 141, 142, displaces the pivots 149 and 150 along the grooves 151 and 152, thus causing inward and outward displacement of the pairs of fingers 157, 158 within the corresponding holes of the sleeve 159, since the pivots 149 and 150 remain always at the same distance from the center of the device while they are rotating about it. The free ends of the fingers 157 and 158 are bifurcated and magnetized.

The device represented in FIG. 8 is analogous to that of FIG. 7. It comprises a double-acting cylinder 160', one end of which is fastened in correspondence of the extension of a ring 161 rotatably assembled on the ball bearings 162. The end of the stem 163, opposite to that connected to the piston slidable in the cylinder 160', is pivoted in an extension of a fixed ring 164. On the ring 161 there are pivoted, at equal intervals along a circumference, the ends 165 of a series of bell-crank levers 166 which, at the other end, terminate with a fork. The bell-crank levers 166 are moreover hinged on the pivots 168 integral with the ring 164. The forward and reverse rotation of the ring 161, originated by the cylinder 160', causes the forward and reverse rotation of the bell-crank levers 166 about the rotating pivots 168 and consequently the advance or retreat of the ends 167 from the center of the device.

The frame 103 also carries a fixed support 168, bearing a ring 169. At the opposite side of the drum there is moreover provided a ring 170 supported by the frame 1. Both the rings 169 and 170 have an outer diameter corresponding to the inner diameter of the bead wires to be applied to the tire carcass.

Small magnets, not shown, are disposed at equal intervals along the periphery of the rings 169 and 170 and function to temporarily hold in place the bead wires applied on the periphery of said rings.

FIG. 9 represents a detail of the small valve 37. This valve comprises two threaded elements 171 and 172 and is provided with an axial opening 173, of variable diameter, in which is enclosed a ball 174 supported by a helical spring 175.

In cooperation with its supporting base provided on the rigid sector 23, the small valve 37 is provided with an opening 176 to allow the air suction from the outside to the inside through the through hole 173.

The operation of the above indicated apparatus will now be described with reference to the various steps of manufacture represented in FIGS. 11 to 16.

According to the process shown in said figures, a reinforcing bead wire 177 is applied both on the ring 169 and on the ring 170, in contact with the series of small magnets provided on said rings, so that said magnets hold the bead wires in place on the rings. Then the sidewall strips 178 and 179 are applied about the lateral sections of the expansible drum, in cylindrical shape and with the sides 7 and 10 at the greatest pre-set mutual distance from each other. For this operation, the tubes 56 and 57 are connected with a vacuum pump in order to displace towards the inside the balls 174 of the valves 36 and 37 and to suction air from the outside to the inside through openings 173 so as to releasably fasten to the openings of said holes the ends of the sidewall strips 178 and 179. The drum is placed into rotation by means of the motor 85, the pulleys 84 and 82 and the belt 83 in order to facilitate the winding of the sidewall strips for a whole turn about the membrane 19. Then one or more carcass plies 180 and the possible strips constituting the other component elements of the carcass, not represented in the figures for the sake of simplicity, are applied on the revolving drum and are stitched by means of conventional rolling devices on the rigid sectors 22, 23 and 67, 68, while legs 70 and 71 are in the position of maximum spreading and the rollers 74 and 75 rest on the projections 65 and 66.

After stopping the motor 85, the carriages 106 and 107 are advanced toward each other to bring the devices 157, 158 in proximity of the annular supports 169 and 170 for the application of the bead wires.

The mutual approach of the carriages 106 and 107 is operated by means of the motor 128, the sprocket wheels 121 and 122 and the chain 120. Then compressed fluid is admitted in the cylinders 141 and 152 so as to actuate the piston extensions to which are pivoted the extensions of the rings 147 and 148 (see FIG. 7). Consequently the rings 143 and 144 rotate on the ball bearings 145 and 146, dragging into rotation the pivots 149 and 150 which, travelling along the corresponding grooves 151 and 152, radially push towards the center of the device the elements 153 and 154 and the corresponding pairs of fingers 157 and 158. The ends of fingers 157 and 158 are bifurcated and, if desired, magnetized, and partially surround the bead wires 177 along the intervals existing between the aforementioned not shown small magnets which are positioned at intervals along the periphery of rings 169 and 170. These fingers detach said bead wires from the pull of said small magnets to carry them off said rings 169 and 170 and the carriages 106 and 107 advance towards each other until fingers 157 and 158 arrive at the position shown in FIGURE 11 for the application of the bead wires at a predetermined point inward of the outer end of plies 180.

At this moment compressed fluid is admitted through the tube 47 and the ducts 44, 46 and 45, connected to it, and the membranes 38 and 39 are inflated; these membranes push radially outwardly the series of rigid sectors 22 and 23 which in turn force surfaces 52, 53 and 54, 55, respectively, against the fixed surfaces 48, 50 and 49, 51, and consequently, against the elastic rings 26 and 27 and against the pairs of rigid sectors 67, 68, thus pressing the carcass plies 180 against the surface of the bead wires 177, to which they adhere (see FIG. 12). Then the fingers 157 and 158 are withdrawn in the corresponding holes of the sleeves 159 and 160 by virtue of discharging the compressed fluid previously admitted into the cylinders 141 and 142, and admitting compressed fluid at the other end so as to cause the rotation of the rings 143 and 144 in the opposite sense. In this way the bead wires 177 remain secured to the carcass plies.

The carriages 106 and 107 are now further mutually advanced by means of the motor 128, until the bells 135 and 136 take a position outside the zone between the two bead wires 177, so that the latter may be progressively advanced towards each other during the shaping of the carcass and, at the end of said operation, may take such a position that a free space is left between the two bells 135 and 136 (see FIG. 13).

The complete shaping of the carcass is carried out by admitting compressed fluid inside the central portion of the membrane 19, through the tube 62 and the ducts 63 and 64, and at the same time by advancing the sidewalls 7 and 10 towards each other by means of the motor 102 which, through the sprocket wheel 100 and the chain 101, actuates the sprocket wheels 98 and 99 and imparts rotation to the shafts 91 and 92 to mutually separate the nut screws 94, 87 and 95, 88.

Consequent to the mutual approach of the sidewalls 7 and 10, the pairs of rigid sectors 67 and 68 are lifted outwardly along the drum midline so as to form an angle with each other, while the legs 70 and 71 are placed in parallel position and in mutual contact, and the rollers 74 and 75 slide radially outwardly along the rings 32 and 33. The drum is placed again in rotation by means of the motor 85, and the ring-shaped reinforcing structure 181, and successively the tread band 182 in the form of a strip, are wound up between the steps 139 and 140 of the outer surface of the bells 135 and 136, which are also dragged into rotation by friction with the underlying carcass, and are adhered to the annular band of the carcass which is accessible between the two bells 135 and 136 (see FIG. 13). Both the ends of the reinforcing structure 181 and those of the tread band 182 are joined to one another.

At this moment the carriages 106 and 107 are separated from each other through operation of motor 128, and the drum is then again rotated by means of motor 85 during which time the stitching of the reinforcing structure 181 and of the tread band 182 onto the carcass outer surface is completed by means of conventional stitching discs 183 and 184 (see FIG. 14). The rotation of the drum is then stopped and the carriages 106 and 107 are mutually readvanced towards each other by means of the motor 128 in order that the rigid cylinders 131 and 132, supported by them, may partially surround the lateral pockets of the membrane 19; then compressed fluid, the volume and the pressure of which have been previously adjusted in the two tanks of variable capacity, is instantaneously admitted through the tube 56 and the relative duct 55 and through the tube 57, the hollow space 58, the hole 59, the gap 60 and the hole 61, to inflate the two lateral pockets of the membrane 19 and to force them against the inner serrated surface of the rigid cylinders 131 and 132 (see FIG. 15). The carriages 106 and 107 are then further mutually advanced whereby the bells 135 and 136 urge the lateral parts of the membrane 19 in an axial direction, thus turning up at the same time the ply edges about the bead wires and the strips constituting the sidewalls and the other component elements of the carcass onto the shaped carcass in order to cause both the ply edges and said strips (see FIG. 16) to firmly adhere to the latter. Following this, carriages 106 and 107 are withdrawn and the tire subsequently is removed.

The apparatus forming the object of the present invention may be of course used to carry out other methods of manufacture, as for instance that represented in FIGS. 17 to 23, according to which the application of the strips constituting the sidewalls and the other possible component elements of the carcass is carried out independently of the turning up of the ply edges about the bead wires.

According to the method illustrated in FIGS. 17 to 23, before starting the tire manufacture, the bead wires 177 are applied on the rings 169 and 170. Then one or more carcass plies 180 are applied on the drum and are stitched, the drum, placed into rotation by the motor 85, having a cylindrical shape and its sidewalls 7 and 10 being at their greatest mutual distance. After the drum is stopped, the carriages 106 and 107 are mutually advanced by means of the motor 128 to bring the bead wires 177 into correct position by means of the series of fingers 157 and 158, which were previously moved towards the axis of the drum by actuating the pistons slidable in the cylinders 141 and 142 (see FIG. 17). Then, as described above, the tubular membranes 38 and 39 are inflated to cause the bead wires 177 to adhere to the carcass plies 180 (see FIG. 18), and the fingers 157 and 158 are withdrawn inside the holes provided in the sleeves 159 and 160.

The carriages 106 and 107 are detached by actuating the motor 128 in the opposite direction, and the plies comprised between the two bead wires are partially shaped by mutually advancing the sidewalls 7 and 10 by means of the motor 102. At the same time, compressed fluid is admitted inside the central portion of the membrane 19 through the tube 62 and the ducts 63 and 64 (see FIG. 19).

In order to turn up the ply edges about the bead wires 177, the carriages 106 and 107 are mutually advanced by means of the motor 128 so that the rigid cylinders 131 and 132, supported by them, may partially surround the two lateral portions of the membrane 19 and then compressed fluid, the volume and the pressure of which have been previously adjusted in the tanks of variable capacity, is instantaneously admitted through conduits 56 and 57 in order to inflate the two lateral pockets of the membrane 19 and to engage them against the inner indented surface of the rigid cylinders 131 and 132.

The carriages 106 and 107 are further advanced so that bells 135 and 136 press the lateral parts of the membrane 19 against the surface of the partially shaped carcass and so that the ply edges are turned up about the bead wires 177 to firmly adhere thereto (see FIG. 20).

At this moment the lateral pockets of the membrane 19 are deflated and the carcass is completely shaped by admitting additional compressed fluid through the tube 62 and by further mutually advancing the drum sidewalls 7 and 10 by means of the motor 102. The bells 135 and 136 are also mutually advanced, by means of the motor 128, in such a way that an annular central strip of the carcass may be left free between them. The motor 85 is actuated again to place the expansible drum into rotation. The ring-shaped reinforcing structure 181, and successively, the tread band 182 in the form of a strip are wound up between the steps 139 and 140 of the outer surface of the bells 135 and 136, which are draged into rotation by friction by the underlying carcass, and are caused to adhere to the annular band of the carcass visible between the two bells 135 and 136 (see FIG. 21). Both the ends of the reinforcing structure 181 and those of the tread band 182 are joined to one another.

At this moment the carriages 106 and 107 are withdrawn by motor 128. By motor 85 again placing the drum into rotation, the reinforcing structure 181 and the tread band 182 are completely stitched on the outer surface of the carcass by means of the stitching discs 183 and 184 (see FIG. 22). At the same time the tubes 56 and 57 are connected with a vacuum pump so as to create a suction (reduced pressure) on the inside through holes 173, and therefore, the ends of the sidewall strips 178 and 179 are secured to the openings of said holes; said strips are then wound up for a whole turn about the membrane 19 to form a continuous ring. The strips constituting the other component elements of the carcass may have been previously stitched to the strips constituting the sidewalls.

Then rotation of the drum is stopped and the connection of the tubes 56 and 57 with the vacuum pump is interrupted. The carriages 106 and 107 are then partially advanced so that the rigid cylinders 131 and 132 surround the outermost part of the lateral pockets of the membrane 19 and said pockets are inflated again by instantaneously admitting compressed fluid, from the pressure tanks, through the tubes 56 and 57, in order to engage them in the indentations of the rigid cylinders 131 and 132 (see FIG. 23).

The carriages 106 and 107 are further mutually advanced in order that the bells 135 and 136 may push the lateral pockets of the membrane 19 against the outer surface of the completely shaped carcass, so that the strips constituting the sidewalls and the other component elements of the carcass are turned up and firmly stitched to the carcass itself (see FIG. 16).

It is understood that some modifications of the above described apparatus may be made without departing from the scope of the present invention; for instance, if plies are inserted on the drum in tubular form and which therefore do not require the stitching of the axial seam, as in the case of plies applied in the form of strips, are used for the tire manufacture, the pairs of sectors 67 and 68 may be lacking.

We claim:

1. An apparatus for the manufacture of pneumatic tires, comprising: a rotary drum including a first and a second rigid sidewall member coaxially mounted relative to each other along the drum rotary axis, said members being positioned respectively on opposite sides of a transverse midplane along said axis and being reciprocably displaceable along said axis either towards or away from each other and from said midplane, each of said members including an inner axial end wall, said end walls facing each other, said members each including a rigid cylindrical portion extending along said axis in a direction away from said inner end, an inflatable tubular membrane circumscribing and extending along the axial extent of said first and second sidewall members and across the axial distance therebetween, said membrane being fluidtightly secured to said first and second members so as to define therewith a fluid-tight chamber circumferentially surrounding said members along an axial extent thereof and along the axial space therebetween, said sidewall members each comprising a set or rigid sectors circumferentially distributed in series about said axis and being radially displaceable in either direction relative thereto, a seat means along the outer periphery of each set of sectors defining a circular seating surface along each set of sectors for receiving a respective bead wire therealong, a first means for supplying a compressed fluid into the portion of said chamber which extends axially between said circular seating surfaces, a second means for supplying a compressed fluid into respective portions of said chamber axially outward of the location of said circular seating surfaces, said membrane being radially expansible in an outward direction on either axial side of said circular seating surface, means preventing axial expansion of said membrane along the extents thereof axially outward of said circular seating surfaces, means for limiting the radially outward displacement of said sectors relative to said axis, means for urging said sectors radially outward and means for displacing said sidewall members along said axis either towards or away from each other, and adjustable means for varying the maximum radial displacement of said sectors whereby the diameter of said circular seating surface may be varied to accommodate different diameter bead wires.

2. The apparatus of claim 1, wherein said seating surface is serrated along the axial extent thereof and said membrane is correspondingly serrated along its inner side along an axial extent thereof which overlies the axial extent of said seating surface and extends beyond both ends thereof.

3. The apparatus of claim 1, a valve means in said membrane at respective points axially outward of both said seat means, said valve means providing a closeable opening leading from exteriorly of said membrane to said chamber defined interiorly of said membrane, vacuum means for creating an underpressure in said chamber.

4. The apparatus of claim 1, including adjustment means for varying the maximum axial distance between said first and second sidewall members.

5. The apparatus of claim 1, wherein said means for urging said sectors radially outward comprises an inflatable tubular membrane positioned between each said sidewall member and a corresponding set of sectors.

6. The apparatus of claim 5, in wherein said last mentioned tubular membrane is positioned against a side of said sectors which is frustoconical in shape with the diameter thereof decreasing in the direction of the drum midplane.

7. The apparatus of claim 5, wherein said last mentioned membranes include axial reinforcement means along the axially outer extent thereof only.

8. The apparatus of claim 1, wherein said seat means comprises a ring of resilient material extending circumferentially about each series of sectors and having an outer surface thereof which defines said circular seating surface.

9. The apparatus of claim 8, wherein each said ring of resilient material includes an extension also of elastic material extending in sealing manner inwardly along the outer surface of said sectors to a point along said end wall, means clamping said extension to said end wall.

10. The apparatus of claim 1, including two rigid cylinders each axially slidable over a respective one of said sidewall members, each said cylinder having an inner cylindrical surface of larger diameter than the outermost surface of said sidewall member whereby said membrane may expand to a limited extent in the radial space between said sidewall member and said cylinder, the inner surface of said cylinder having means for gripping said membrane when expanded and holding same against axial displacement relative to the surface of said cylinder, a bell rotatably mounted on the inner axial end of each said cylinder and facing the drum midplane, both bells in combination defining a rigid circular band having an outer diameter corresponding to the outermost diameter of a tire carcass.

11. The apparatus of claim 10, wherein said means for gripping said membrane comprises a series of serrations on said inner surface of said cylinder and a corresponding series of serrations along the outer surface of said membrane.

12. The apparatus of claim 10, including a means on each of said cylinders for carrying a circular bead wire along the axial extent of a corresponding sidewall member from the outer axial end thereof up to the location of said circular seating surface, and means for transferring said bead wire from said wire carrying means and onto said seating surface.

13. The apparatus of claim 12, including a pair of rigid stationary rings positioned opposite each other at respective points axially outward of said drum, said rings each being adapted to hold a bead wire in circular form along an outer periphery of the ring, said cylinders each being slidable over a respective said ring, and said means on said cylinders being adapted to remove a bead wire from said rings.

14. The apparatus of claim 13, including a magnet means for holding a bead wire along the outer periphery of said stationary rings.

15. The apparatus of claim 12, said means for carrying a bead wire comprising a plurality of circumferentially spaced apart circularly disposed pin members mounted on each of said rigid cylinders for reciprocal radial movement relative to said axis, a cam means for simultaneously moving all said pins either towards or away from said axis, said pin members having inner ends defining a circle of larger diameter than that of said membrane when same is deflated and said pin members are radially outward, the inner ends of said pin members being adapted to releasably hold a bead wire, said cam means being adapted to radially move said pin members to an inner position at which the inner ends thereof hold a bead wire in radial alignment with said seat means.

16. The apparatus of claim 15, said cam means comprising a rigid ring and a rotatable ring coaxially mounted on said rigid cylinder, a bell crank lever pivotally mounted on said rigid ring about a vertex of said lever, one end of said lever being pivotally mounted on said rotatable ring and the other end of said lever being free and carrying a said pin member, a double acting drive means mounted between said rotatable ring and a stationary part of said rigid cylinder for rotating said rotatable ring in either rotative direction.

17. The apparatus of claim 15, said inner ends of said pin members being contoured in conformity with the outer periphery of a bead wire.

18. The apparatus of claim 15, said cam means comprising a rigid ring and a rotatable ring coaxially mounted adjacent each other on said rigid cylinder, axially extending rigid pin means in said rotatable ring slidably engaged along a groove means in a follower plate which is radially slidably mounted on said rigid ring, whereby rotation of said rotatable ring in opposite directions causes said pin means to drive said follower plate in respective opposite radial directions, said pin members being rigidly mounted on said follower plate.

19. The apparatus of claim 18, including a double acting drive means mounted between said rotatable ring and a stationary part of said rigid cylinder for rotating said rotatable ring in either rotative direction.

20. The apparatus of claim 1, wherein said end walls are axially spaced apart from each other, including a series of first and second tiltable sectors arranged in a circular series about said axis and spanning the axial distance between said end walls of said sidewall members, said tiltable sectors each comprising a pair of rigid plate members hingedly interconnected about an axis coinciding with said midplane, a portion of each said plate members freely bearing against a respective one of said sidewall members whereby said plate members tilt progressively to a greater extent with their tilt axis moving progressively radially outwardly as said sidewall members come closer together, said plate members forming a pair of inclined surfaces along the inner side of said membrane when same is inflated and said sidewall members are at their closest positions relative to each other.

21. The apparatus of claim 20, a hinge means interconnecting said rigid plate members and comprising a resilient member normally urging said plate members to assume a planar disposition relative to each other, said portion of each of said plate members comprising an arm rigidly extending from the plate member and slidingly engaging a said axial inner end of a respective said sidewall member.

22. The apparatus of claim 21, including a series of axial projections on each of said end walls for supporting said portion of each of said plate members, the projections on one of said end walls being circumferentially offset relative to those on the facing end wall whereby said projections intermesh when said end walls are closest to each other.

23. The apparatus of claim 21, including limit means to restrict the extent to which said resilient member may tilt said plate members.

24. An apparatus for manufacturing pneumatic tires and the like comprising a drum having two coaxial rigid sidewalls equally spaced from a center plane and adapted to be mutually advanced towards each other, a radially expansible tubular membrane having two ends each of which is rigidly secured to opposite sidewalls in an airtight manner, said tubular membrane comprising two lateral portions extending outward from the respective ends of said tubular membrane, each lateral portion lying on at least a portion of said drum and being turned back upon itself, the turned back portion of which extends towards said center plane, said tubular membrane further comprising a central portion coaxial with said lateral portions and connected to said folded back portions thereof, a pair of radially expansible means located within said drum each at the boundary between a lateral portion and said central portion for forcing any layer of material on said tubular membrane radially outward into rigid engagement with a bead wire positioned at said boundary and for providing a fluid-tight partition between the drum space beneath said lateral portion and the drum space beneath said central portion, means for retaining a circular bead wire coaxial with said drum independently of said expansible means until the bead wire is engaged in response to said expansible means, means for introducing fluid under high pressure to the central drum space for causing said central portion to expand, and drive means for mutually advancing said expansible means toward each other, and means for introducing fluid under high pressure to the drum spaces beneath said lateral portions of said tubular membrane for expanding the same and causing the part of each lateral portion contiguous the bead wire position to turn about the bead wire position outwards and towards the expanded central portion.

25. An apparatus as set forth in claim 24, comprising a plurality of sectors positioned between said radially expansible means for presenting a flat surface between the pair of said radially expansible means when the latter are spaced a maximum distance from each other, said sectors comprising members for forcing the flat surface outwards and away from the axial direction when said expansible means are moved toward each other.

26. An apparatus as set forth in claim 24, further comprising a pair of coaxial bell members rotatably mounted on movable cylinder means for engaging the material on said central portion when the latter is inflated and having outer surfaces adapted to receive a cylindrical tread band, said bell members being movable toward and away from said drum central plane.

27. An apparatus as set forth in claim 26, wherein there are provided bead wire maintaining means comprising movable fingers each having a bifurcated end to engage the bead wire and means mounted on each said movable cylinder for selectively moving said fingers toward and away from the axis of said drum.

References Cited

UNITED STATES PATENTS

| 2,605,198 | 7/1952 | Haase | 156—403 X |
| 3,053,308 | 11/1962 | Vanzo et al. | 156—416 |
| 3,134,079 | 5/1964 | Giletta et al. | 156—415 |
| 3,185,607 | 5/1965 | Nebout | 156—401 X |
| 3,265,549 | 8/1966 | Woodhall et al. | 156—416 X |

HAROLD ANSHER, *Primary Examiner.*

U.S. Cl. X.R.

156—403, 412, 415, 416